US010214181B2

(12) United States Patent
Schindler

(10) Patent No.: US 10,214,181 B2
(45) Date of Patent: Feb. 26, 2019

(54) UNIVERSAL SENSOR ASSEMBLY FOR DETECTING OPERATOR GESTURES IN VEHICLES

(71) Applicant: HUF HULSBECK & FURST GMBH & CO. KG, Velbert (DE)

(72) Inventor: Mirko Schindler, Velbert (DE)

(73) Assignee: HUF HULSBECK & FURST GMBH & CO. KG, Velbert (DE)

( * ) Notice: Subject to any disclaimer, the term of this patent is extended or adjusted under 35 U.S.C. 154(b) by 324 days.

(21) Appl. No.: 14/761,025

(22) PCT Filed: Jan. 7, 2014

(86) PCT No.: PCT/EP2014/050107
§ 371 (c)(1),
(2) Date: Jul. 15, 2015

(87) PCT Pub. No.: WO2014/111287
PCT Pub. Date: Jul. 24, 2014

(65) Prior Publication Data
US 2015/0367816 A1 Dec. 24, 2015

(30) Foreign Application Priority Data
Jan. 18, 2013 (DE) ........................ 10 2013 100 522

(51) Int. Cl.
*G01C 3/08* (2006.01)
*B60R 25/20* (2013.01)
(Continued)

(52) U.S. Cl.
CPC ...... *B60R 25/2045* (2013.01); *B60R 25/2054* (2013.01); *G01S 7/486* (2013.01); *G01S 7/497* (2013.01); *G01S 17/89* (2013.01)

(58) Field of Classification Search
CPC .......... G01S 17/89; G01S 7/497; G01S 7/486; B60R 25/2045; B60R 25/2054
(Continued)

(56) References Cited

U.S. PATENT DOCUMENTS 9,110,169 B2 * 8/2015 Stettner ............... B60R 21/0134
2014/0007022 A1 * 1/2014 Tocino Diaz ........... G06F 3/017
715/863

FOREIGN PATENT DOCUMENTS

DE 10147807 A1 4/2003
EP 1798577 A2 6/2007
(Continued)

OTHER PUBLICATIONS

Holte, et al., Fusion of Range and Intensity Information for View Invariant Gesture Recognition, In Computer Vision and Pattern Recognition Workshops, 2008, CWPRW'08, IEEE Computer Society Conference on, pp. 1-7, IEEE, 2008.
(Continued)

*Primary Examiner* — Mark Hellner
(74) *Attorney, Agent, or Firm* — Quarles & Brady LLP

(57) ABSTRACT

The invention relates to a sensor device (2) for a motor vehicle (1). The sensor device has a light source (10) and a detection device (20), said detection device being formed using an array of optical pixels. The light source (10) and the detection device (20) are coupled to a control and evaluation device (30) which activates the light source (10) to emit light pulses and the detection device to carry out the detection process. The control and evaluation device (30), the detection device (20) and the light source (10) together act as a time-of-flight camera (ToF camera), allowing spatial range data to be detected. The control and evaluation device (30) is designed to operate the light source and the detection device in at least two modes, i.e. an initialization mode and a measuring mode. The control and evaluation device (30)
(Continued)

Figure 1:
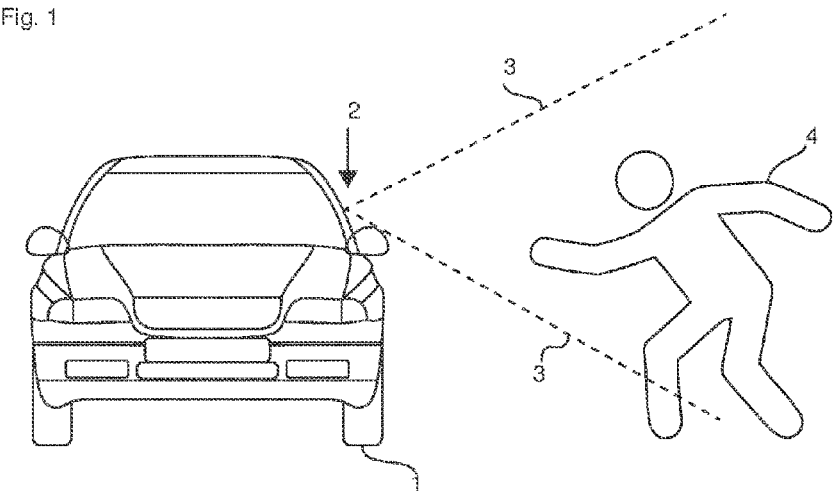

activates the detection device in the initialization, mode and interrogates all the pixels at least once to obtain signals. Each pixel is classified into a group of relevant pixels or into a group of irrelevant pixels depending on the result of this interrogation. The detection in measuring mode is permanently adapted in such a way that only the signals of the pixels from the group of relevant pixels are taken in consideration for the measurement.

10 Claims, 2 Drawing Sheets

(51) Int. Cl.
    *G01S 17/89*     (2006.01)
    *G01S 7/486*     (2006.01)
    *G01S 7/497*     (2006.01)

(58) Field of Classification Search
    USPC ....................................................... 356/5.01
    See application file for complete search history.

(56)             References Cited

FOREIGN PATENT DOCUMENTS

| | | |
|---|---|---|
| EP | 1927867 A1 | 6/2008 |
| WO | 2004055544 A1 | 7/2004 |

OTHER PUBLICATIONS

PCT International Search Report, PCT/EP2014/050107, International Search Report, dated Apr. 14, 2014.

\* cited by examiner

60

20

UNIVERSAL SENSOR ASSEMBLY FOR DETECTING OPERATOR GESTURES IN VEHICLES

CROSS-REFERENCE TO RELATED APPLICATIONS

This application represents the national stage entry of PCT international Application No. PCT/EP2014/050107 filed Jan. 7, 2014, which claims priority of German Patent Application No. 10 2013 100 522.5 filed Jan. 18, 2013, the disclosures of which are hereby incorporated by reference in their entirety for all purposes.

The invention relates to sensor assemblies that are used for the optically-supported detection of operator gestures or operator activities in motor vehicles.

In particular, the invention relates to sensor assemblies that can detect and evaluate information resolved in time and space in order to discern the operating intent of the user.

Optical methods are known in the prior art that discern actuations in reaction to an evaluation of image information and subsequently trigger e.g. switching procedures. For example, this includes automated video evaluations of monitoring systems that read out patterns or movements from individual images, or a sequence of images. Furthermore, numerous other optically-supported systems are known, light barriers or brightness sensor being among the most basic. However, optical systems of greater complexity frequently use an array of optically-sensitive detection units, generally termed pixels, that record optical information in parallel, for example in the form of a COD array.

DE 10 2008 025 669 A1 discloses an optical sensor that detects a gesture, and a closing element of a vehicle is then automatically moved.

WO 2008/116699 A2 addresses an optical sensor chip and relates to an optical anti-pinch sensor device to monitor a window pane, sliding door, or a tailgate in a motor vehicle.

WO 2012/084222 A1 discloses an optical sensor for actuating and monitoring a closing element.

Since gesture control is gaining ever greater acceptance in various technical fields, attempts were also made to use such exclusively optical systems to discern operator intent in motor vehicles. With these systems, the detection of operations by means of capacitive systems still predominates.

DE 10 2011 089 195 A1 discloses a system for the contact-free detection of objects and operator gestures with an optically-supported device of a similar kind which can also be used for the invention. However, such systems must frequently be individually adapted to the area of use in the vehicle such that various devices must be provided for different assembly positions and installation conditions.

The object of the invention is to provide an optically-supported and universal system for controlling operation in access systems for vehicles.

The object is achieved with a device having the characteristics of claim 1.

The system according to the invention uses optical detection, although not exclusively image detection. A pixel array is used with a timed activation which permits distance detection and can detect object movement by analyzing the distance information over time. Detection devices are known that detect pixel-related location information, in particular a distance from the sensor or detection device. These systems are for example designated "Time-of-Flight" systems or also "3D imagers" or "range imagers", depending on the evaluation method used. The areas of application of such systems are in the field of industrial automation, safety engineering and the automotive sector. In an automobile, 3-D sensors are used in lane assist systems, for pedestrian protection or as parking assistance. Such concepts of triangulation as well as interferometry and Time-of-Flight (ToF) measurement can be implemented with optical sensors.

The system according to the invention has an array of light-sensitive pixels as well as a light source. The light source is arranged in the area of the array of sensitive pixels, for example at a slight distance from the array. A control circuit controls both the operation of the light source as well as the operation of the pixel array.

In this context, reference is made to developments thereof that describe the technical concepts and their realization in detail, in particular in the dissertation "Photodetektoren und Auslesekonzepte für 3D-Time-of-Flight-Bildsensoren in 0.35 µm-Standard-CMOS-Technologie" [Photodetectors and readout concepts for 3-D Time-of-Flight image sensors in 0.35 µm standard CMOS technology], Andreas Spickermann, Faculty of Engineering Sciences at the University of Duisburg-Essen, 2010.

Furthermore, reference is made to the publication "Optimized Distance Measurement with 3D-CMOS Image Sensor and Real-Time Processing of the 3D Data for Applications in Automotive and Safety Engineering", Bernhard König, Faculty of Engineering Sciences at the University of Duisburg-Essen, 2008.

The above works describe the concept and realization of useful optical sensor systems; reference is therefore made in this application to their disclosure, and they will only be explained to clarify those aspects relevant to understanding the application.

The invention relates to a sensor array that uses the Time-of-Flight (ToF) method which will therefore be briefly explained at this juncture.

In the ToF method, a space is illuminated with a light source, and the propagation time of the light reflected by an object in the space is recorded by a surface sensor. The light source and sensor should be arranged as close to each other as possible. The distance between the sensor and object can be determined from the linear relationship of the light propagation time and speed of light. To measure the time delay, synchronization must exist between the light source and sensor. The methods can be optimized by using pulsed light sources since short light pulses (in the ns range) enable efficient suppression of background light. In addition, by using pulsed light, potential ambiguities are avoided in determining the distance as long as the distance is sufficiently large.

On the one hand, the light source is operated in a pulsed manner in this approach. On the other hand, the detection unit, i.e. the pixel array, is configured to be pulse-sensitive, i.e., the integration of the individual pixels is synchronized in time with the light source, and the duration of integration is limited. By comparing the results with different integration times, the effects of background light in particular can be calculated out.

It is pertinent that this detection method is not an image-based detection method. Each pixel determines distance information which occurs by detecting light over time. When a pixel array is used, a matrix of distance values exists that permits object movements to be interpreted and tracked during cyclical detection.

According to the invention, the universally usable sensor device has a pixel array that can be adapted automatically to different installation situations. To this end, an array is used according to the invention with a universally useful shape and number of pixels. In contrast to known devices, the activation and evaluation device has an initialization mode or calibration mode. At least two operating modes of the light source and pixel array can be activated by the activation and evaluation device: the initialization mode and the detection mode provided after initialization.

In initialization mode, the device determines in a calibration procedure which pixels of the installed sensor device are available for sensor-based detection with reference to the installation situation. In initialization mode, the light source is operated, and the pixels which have a signal pattern that is compatible with the activation scheme of the light source are determined. The pixels that do not manifest a compatible signal change when the light source is activated according to an initialization scheme are permanently disabled, in any case until the next initialization, or their values are at least overlooked in the evaluation of the image data and distance data.

The evaluation scheme for the pixel array is adapted depending on the data which are obtained during initialization. Correspondingly, the evaluation scheme only accesses those pixel values after a performed initialization procedure which have manifested a reaction to the specified extent to the activation of the light source during initialization.

For initialization itself, different activation schemes can be used for the light source and the evaluation device. For example, the light source can be activated to emit light during initialization for a greater period such as a few seconds. During this emission time, the pixel array is activated several times for different periods, and a check is performed of whether there is a consistent signal increase from the pixels depending on the duration of activation. In addition, the signal responses are compared via the pixel field. In this manner, the pixels are either classified as relevant pixels or as irrelevant pixels in the control and evaluation device. This grouping is permanently saved in the control and evaluation device. Only the signals of the relevant pixels are accessed until the next initialization.

It is material that a pixel field with uniform measurements in detection mode can have different active field sizes. Such a universal sensor device can then be used at different positions in the vehicle and in different installation situations. Sensor arrangements of the same design can for example be mounted as a door monitor on the B-column of vehicles or in the rear region or front region of the vehicle for monitoring. The free exposure of the sensor array to the detection region differs at various installation positions, limited, for example, by the size of the detection openings or by other structures in the vehicle.

It is furthermore material that the calibration of the sensor field is fully automated during initialization mode. By means of the initialization protocol, the sensor-activatable surface of the pixels is detected by the light source control and the control of the evaluation device. As criteria, those criteria can be used which permit differentiation of the pixel reaction. According to the invention, e.g. the behavior of the pixels across the surface can be compared. If, in different measuring procedures, groups of pixels indicate different distances of objects whereas other pixel groups always indicate the same distances, it can be assumed that the latter pixels are covered by vehicle parts and are not freely exposed to the detection area. The initialization procedure can be continued until clear differences in the pixel behavior are detected.

When using the invention, an artificial environment can also be created for the calibration process. For example, a hemispherical arrangement provided for this purpose with its hollow side placed over the light source and sensor field to enable even illumination of the arrangement.

Such a hemisphere ensures reliable detection of the actually active pixels, i.e., those with a free exposure to the detection region. Alternately, different hemispheres or other objects can be held sequentially in front of the sensors, and only those pixels that also reveal a different distance during activation are considered valid pixels.

The initialization per se can be instigated by a user, or performed once during the assembly of the vehicle. Furthermore, initialization can also be repeated in order to calibrate the currently accessible region for detection. In the last-cited case, it is possible to configure the initialization such that for example temporary structures in the vehicle or other changes that lead to an impairment of the sensor field are taken into account by an initialization of the sensor device and corresponding deactivation of the inaccessible pixels.

According to the invention, in addition to the normal detection mode, an initialization mode is provided that executes a calibration protocol and saves a subgroup of the pixels as accessible for detection.

Only these pixels are subsequently also evaluated when operating the sensor arrangement.

The invention will now be explained in more detail using an exemplary embodiment.

Figure 2:
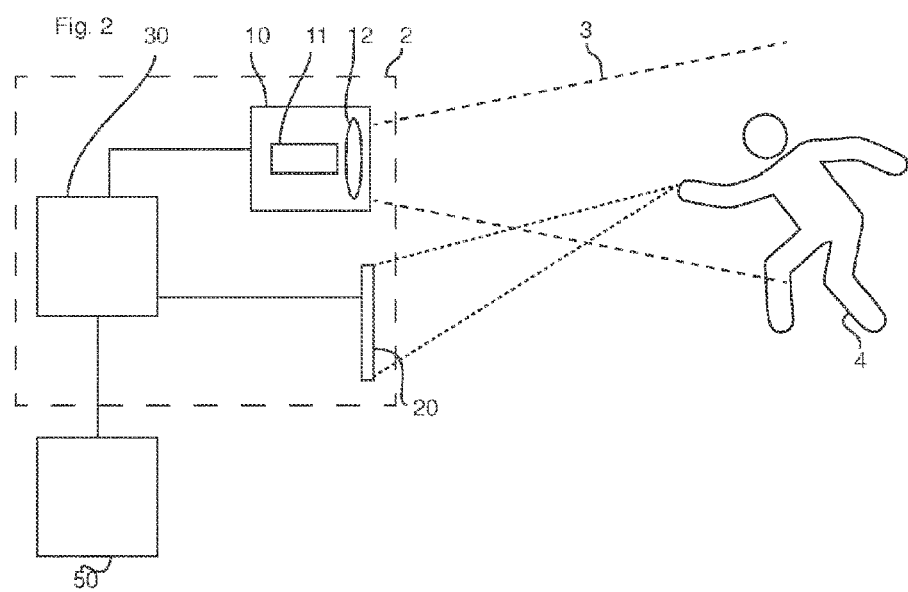
Figure 3A:
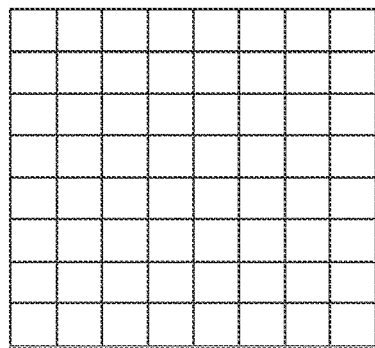
Figure 3B:
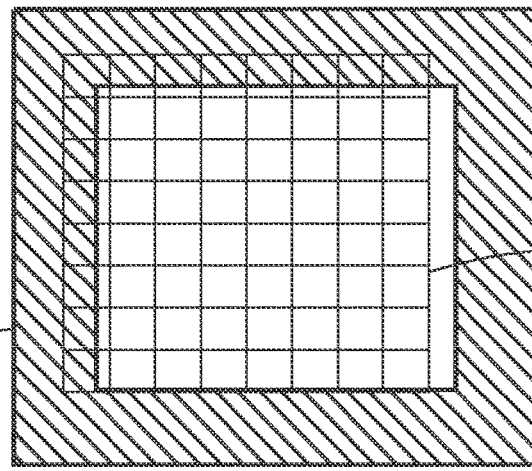
Figure 3C:
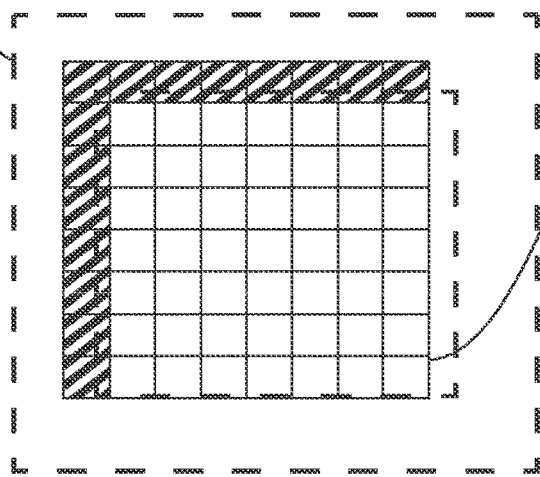

FIG. 1 schematically illustrates the situation of use of a detection device according to the patent in a vehicle;

FIG. 2 shows the active components of a detection device in a schematic representation;

FIGS. 3a to 3c schematically illustrate a sensor field in different operating modes.

As shown in FIG. 1, a vehicle 1 is equipped with a sensor device 2 according to the invention. The sensor device 2 detects activities and movements in a detection range 3 indicated by lines in this case. A user 4 who approaches the vehicle has the opportunity of performing gestures within the detection range 3 to invoke vehicle functions. In the embodiment shown here, the detection device 2 is housed in the side of the vehicle, for example in the B-column. Such a detection device can however also be arranged at any other location in the vehicle, in particular in the rear region or the front region.

FIG. 2 shows the components of the detection device in a schematic representation. In this representation, the vehicle 1 is not shown so that the depiction will not be cluttered.

The device 2 has a light source 10 which is formed in this example by a laser diode 11 and an expanding lens system 12. The lens system 12 expands the beam cross-section to form a wide detection area 3 which a user 4 can enter and in which he can perform gestures. This can be for example a simple plastic lens system such as a Fresnel lens.

A detection array 20 is arranged adjacent to the light source aligned with the sensitive region facing the detection region 3. The array 20 contains columns and lines of sensitive pixels and is configured in this example as a CCD array. Both the light source 10 as well as the array 20 are coupled to a control device 30 which enables clocked and time-controlled operation of the light source and the detection device. If the light source is activated to transmit a light pulse and the pixel array is activated to detect, the individual pixels integrate the incident light energy. The charges of each pixel which are then available after integration are evaluated in the control device such that a detection value characteristic of the integration time period is generated for each pixel.

By means of this scheduled and synchronized activation of both the light source 10 as well as the detection device 20, detection of the light propagation time and hence distance detection is possible for each pixel of the detection device 20. In regard to the precise functions, reference is made to the subject matter disclosed in the aforementioned publications, especially the known time-of-flight devices.

In an example, FIG. 2 shows that part of the light emitted by the light source is scattered or reflected by the hand of the user 4 and falls on the detection device 20. In practice, the light information of course does not originate solely from a single point which scatters or reflects the light; rather, all of the light received from all the visible points is integrated. The surroundings also contribute to the strength of detection. However, algorithms and sensor arrangement operating methods are known by means of which the surrounding light can be largely calculated out. In particular, a plurality of images can be taken in quick sequence with different time parameters in order to calculate out the background light. Such a detection can in particular occur with different integration times in order to eliminate background light influences. If for example the light pulse is transmitted with an unchanging duration but the length of the integration is varied, the background influences have a linear relationship with the integration time, whereas the influences arising from the light pulse only exist for the duration of the light pulse.

The control and evaluation device 30 records the contact information and recalculates it in an array of distance information. A 3-D map of the surroundings can be generated thereby, 3-D information of spatial changes and object movements within the detection region 3 can be detected by means of a temporal sequence of manual controls. For example, the swinging of a hand of a user 4 can be detected. The control device 30, and the entire detection device 2 through the control device 30, is coupled to a central control device 50 of the motor vehicle. Gestures can be recognized by means of a library in the control and evaluation device 30, or a temporal sequence of 3-D spatial data is fed to the central control device 50 to be evaluated there. The central control 50 then initiates the triggering of the function of the motor vehicle depending on the detected data, such as the lowering of a side window or the opening of a door.

As shown in FIG. 1, it is necessary for a user 4 to be in a detection range 3 of the detection device 2 in order to trigger an actuation. During the majority of its life, a vehicle is standing still waiting to be started. During these times, it is very important to minimize the output or power requirement of all the devices in vehicles.

FIGS. 3a, 3b and 3c show a schematic representation of a CCD array that can be operated with the time-of-flight method to detect according to the invention. In this example, the array consists of a square chip with 8 columns and 8 lines. This is only a value for illustration; in practice, a significantly higher resolution is possible. On the other hand, such a chip does not need to possess the extent of resolutions of an optical chip for detail-rich images to enable gesture detection according to the invention. The number of 1024 pixels already allows a differentiated evaluation of user gestures since repeated distance measurements are performed for each of these pixels, and a profile of movement is determined over a sequence in time. Reliable gesture detection is still feasible even with a fewer number of pixels.

FIGS. 3a to 3c schematically portray an installation situation and the result of an installation procedure.

FIG. 3a shows a pixel field with eight lines and eight columns which are all always available for detection. In the installation situation, it is clear that the pixel field 20 is inserted behind a body structure 60 with an opening, and the left column and top line of the field 20 are at least partially covered. In this manner, reliable detection is impossible in the relevant cells in this column and this line. In this state, an initialization procedure is triggered. The control and evaluation circuit activates the light source in order to transmit light for a duration of e.g. 5 seconds. During this time, the surroundings of the sensor device are left unchanged, or for example artificial surroundings are created by covering with a bright plastic hemisphere whose cavity covers both the light source as well as the detection device. The sensor field 20 is activated for different lengths of time within this 5-second window, and the respective brightness values are saved. Different measurements are performed when the light source is turned off. If the pixels in the middle of the pixel field 20 manifest significant changes in brightness and the pixels in the edge regions however do not, these edge pixels are deactivated which manifest a dynamic below a set threshold. These pixels are associated and saved as a group of irrelevant pixels in the control and evaluation device.

As an additional or alternative measurement, a sequence of short measurements is performed according to conventional time-resolved measurements of a time-of-flight evaluation. It is also checked whether the pixel responses are consistent, i.e., whether for example the pixels in the middle region supply changing distance values, and the pixels in the edge region supply consistent values.

By means of the measurement data obtained in this manner, it can be discerned on one hand whether free exposure of the pixels in the measuring environmental is ensured, and whether useful data regarding the measuring distance can be determined on the other hand. For all of the pixels which according to the evaluation do not have a free exposure to the detected measuring region, deactivation of the pixels for the subsequent detection procedures is written into the memory of the control and evaluation device.

The evaluation scheme of the control and evaluation device is adapted after initialization such that only the pixels identified as valid are used for subsequent distance measurement and spatial detection. Scalable evaluation schemes for spatial movement patterns are saved in the control and evaluation device for this purpose. These evaluation schemes can be internally scaled to the actually active pixel area. Alternately, the sensor arrangement can also be trained with the inactive sensor device by performing gestures which are saved as valid gestures in a neural network.

The invention claimed is:

1. A sensor device for a motor vehicle, the sensor device comprising:
   a light source;
   a detection device having an array of optical pixels detecting light; and
   a control and evaluation device coupled to the light source and the detection device, the control and evaluation device activating the light source to emit light pulses and activating the detection device to detect light from the light source, and evaluating signals generated by the pixels of the detection device corresponding to the light detected by the detection device, wherein the control and evaluation device, the detection device, and the light source interact as a time-of-flight camera (ToF camera), allowing spatial range data to be detected, and the control and evaluation device operates the light source and detection device in at least two modes: an initialization mode and a measuring mode, in the initialization mode, the control and evaluation device activates the light source and the detection device and queries the signals of all the pixels at least once and, depending on the results of the query, each pixel is assigned to a group of relevant pixels or a group of irrelevant pixels, and in the measuring mode, the control and evaluation device only evaluates the signals of the pixels from the group of relevant pixels.

2. The sensor device according to claim 1, wherein the control and evaluation device activates the light source in the initialization mode in a different manner than the measuring mode for emitting unpulsed operation.

3. The sensor device according to claim 1, wherein the control and evaluation device activates the light source in the initialization mode in a different manner than the measuring mode for emitting different light strengths at different times.

4. The sensor device according to claim 1, wherein the control and evaluation device in the initialization mode performs several measurements and compares the signal dynamics of the pixels across the array in order to classify pixels with a signal dynamic below a set threshold as irrelevant pixels.

5. A method of detecting gestures, the method comprising:
emitting at least one light pulse from a light source;
detecting a reflection of the at least one light pulse using an array of optical pixels detecting light;
generating signals corresponding to the reflection of the at least one light pulse detected by each pixel of the array of optical pixels;
evaluating the signals of all of the pixels at least once in an initialization mode and, depending upon the results of the query, assigning each pixel to a group of relevant pixels or a group of irrelevant pixels;
emitting at least one subsequent light pulse from the light source;
detecting a reflection of the subsequent light pulse using the array of optical pixels detecting light;
generating a subsequent signal corresponding to the reflection of the at least one subsequent light pulse detected by each pixel of the array of optical pixels; and
evaluating the subsequent signal of the pixels from the group of relevant pixels in a measurement mode to determine a change indicating a gesture.

6. The method according to claim 5, in which the array of optical pixels and the light source interact as a time-of-flight camera (ToF camera).

7. The method according to claim 5, in which a control and evaluation device couples to the light source and a detection device including the array of optical pixels performs the steps of evaluating the signals and subsequent signals.

8. The method according to claim 7, wherein the control and evaluation device activates the light source in the initialization mode in a different manner than the measuring mode for emitting unpulsed operation.

9. The method according to claim 7, wherein the control and evaluation device activates the light source in the initialization mode in a different manner than the measuring mode for emitting different light strengths at different times.

10. The method according to claim 7, wherein the control and evaluation device in the initialization mode performs several measurements and compares the signal dynamics of the pixels across the array in order to classify pixels with a signal dynamic below a set threshold as irrelevant pixels.

* * * * *

UNITED STATES PATENT AND TRADEMARK OFFICE
CERTIFICATE OF CORRECTION

PATENT NO. : 10,214,181 B2
APPLICATION NO. : 14/761025
DATED : February 26, 2019
INVENTOR(S) : Mirko Schindler It is certified that error appears in the above-identified patent and that said Letters Patent is hereby corrected as shown below:

In the Specification

Column 1, Line 31, "COD" should be --CCD--.

Signed and Sealed this
Sixteenth Day of April, 2019

Andrei Iancu
*Director of the United States Patent and Trademark Office*